Patented Mar. 29, 1938

2,112,556

UNITED STATES PATENT OFFICE 2,112,556

RESINOUS COMPOSITIONS AND PROCESS OF MAKING SAME

James B. Bullitt, Jr., Swarthmore, and Donald E. Edgar, Philadelphia, Pa., assignors to E. I. du Pont de Nemours & Company, Wilmington, Del., a corporation of Delaware No Drawing. Application October 9, 1935, Serial No. 44,270

2 Claims. (Cl. 134—26)

This invention relates to resinous compositions and more particularly to a combination of oil or oil acid modified polyhydric alcohol-polybasic acid resin and urea-formaldehyde condensation product.

Resinous products obtained from the reaction of urea and formaldehyde possess certain disadvantages in their use as coating compositions as such, among which may be noted the lack of flexibility. Further the resins are sparingly soluble in the usual organic solvents which introduces difficulties in their applications. These resinous materials, however, possess certain desirable properties of being relatively colorless and hardening rapidly under the influence of heat. Attempts have been made to prepare coating compositions from resinous materials obtained from the reaction of urea and aldehydes but with apparently little commercial success.. The fatty oil and fatty oil modified polyhydric alcohol-polybasic acid resins are used as protective and decorative coating compositions quite satisfactorily but require longer heat treatments to produce satisfactorily hard films than is often practical. A combination of the resinous product obtained from urea and formaldehyde and fatty oil modified polyhydric alcohol-polybasic acid resins has been proposed but this practice has been limited specifically to the use of so-called non-drying oil modified polyhydric alcohol-polybasic acid resin because of the difficulties encountered when attempting to produce combinations of urea-formaldehyde resinous products and other fatty oil modified polyhydric alcohol-polybasic acid resins than the non-drying oil modified resin. Many of the fatty oil modified polyhydric alcohol-polybasic acid resins are not satisfactorily compatible with the reaction product of urea and formaldehyde as is evidenced by the non-homogeneous compositions which are obtained.

This invention has as an object the manufacture of new and useful resinous compositions comprising a combination of the reaction product of urea and formaldehyde with fatty oil modified polyhydric alcohol-polybasic acid resins. A further object is the provision of a process for preparing these resinous compositions which is successfully and advantageously used with the drying and semi-drying oils as well as with the non-drying oils. Other objects will appear hereinafter.

These objects are accomplished according to the present invention by preparing the fatty oil modified polyhydric alcohol-polycarboxylic acid resin with oils which have been subjected to an oxidizing treatment as by blowing with air, and then heating this resin in solution with urea-formaldehyde condensation product. The heat treatment of the solution of polyhydric alcohol-polybasic acid resin with the urea-formaldehyde condensation product is continued, usually at a temperature of 95° C. to 125° C., until the urea-formaldehyde condensation product is dissolved or dispersed in the solution.

The following examples are illustrative of methods which may be used for carrying out the invention:

Example I 45 parts of a blown linseed oil, 9 parts of 95% glycerol and 0.04 part of litharge as an alcoholysis catalyst were heated with agitation in a suitable container to a temperature of 220–240° C. The material was held within this temperature range until a sample removed therefrom was clear and homogeneous and soluble in 2 parts of methyl alcohol. 42.5 parts of phthalic anhydride and 9.9 parts of 95% glycerol were then added and the material maintained at a temperature of 220–225° C. until the product possessed an acid number of between 50 and 60.

1 part of the resinous product thus obtained was dissolved in 2 parts of monoethyl ether of ethylene glycol. To this was added 1 part of the reaction product of urea and formaldehyde and the material heated to 100° C. $\pm$ 5° C. until substantially all of the solid material was in solution. The material was then allowed to cool and any slight amount of solid material remaining removed by straining, filtering or centrifuging.

Example II 50 parts of a heavy blown cottonseed oil, 10 parts of 95% glycerine and 0.05 part of sodium hydroxide were heated with agitation in a suitable container to a temperature of 220–240° C. Heating within this temperature range was continued until a sample drawn from the material was clear and homogeneous and soluble in 2 parts of methyl alcohol. To this was then added 38.6 parts of phthalic anhydride, 7.2 parts of 95% glycerol and the heating continued at 220–225° C. until the material possessed an acid number of between 30 and 40.

1 part of the resinous product thus obtained was dissolved in 2 parts of butyl alcohol. To this was then added one part of the reaction product of urea and formaldehyde and the mixture heated at 100° C. $\pm$ 5° C. until substantially all of the solid material was in solution. Any undissolved material may be removed by straining, filtering or centrifuging.

The resulting resinous combination when applied as protective coating produces a hard, tough and durable film after baking, for example, for 20 minutes at 100° C.

Example III 45 parts of blown soya bean oil, 9 parts of 95% glycerol and 0.04 part of litharge were heated in a suitable container to 220-240° C. until a sample of the material was clear and homogeneous and soluble in 2 parts of methyl alcohol. 42.5 parts of phthalic anhydride and 9.9 parts of 95% glycerol were then added and the heating continued at 220-225° C. until the material possessed an acid number of 60±5.

1 part of the resinous product thus obtained was dissolved in 2 parts of ethyl ether of ethylene glycol. To this was added 1 part of the reaction product of urea and formaldehyde and the mixture heated at 100° C.±5° C. until the solid material was substantially all dissolved. Any small amount of undissolved material may be removed by suitable means.

In place of the reaction product of urea and an aldehyde the reaction product of thiourea and an aldehyde may be combined with the blown oil or oil acid modified polyhydric alcohol-polybasic acid resins. The reaction product of urea and formaldehyde for example may include methylol urea, dimethylol urea, methylene urea, a mixture of these or polymerization products thereof. The term reaction product of urea and formaldehyde for the present purpose, therefore, embraces any or all products which may be prepared according to the well known procedures.

The blown oils or oil acids may be prepared according to procedures well known in the art of treating oils and the acids derived therefrom. For example, a typical procedure consists in heating the oil to a temperature of between approximately 160-220° F. and while maintaining temperature passing air through the body of the oil. This operation is commonly known as blowing the oil. The air is passed through the oil until the desired properties with respect to, for example, reduced iodine value and increased viscosity are obtained. Blown oils are well known and the production of oils having particular properties will be readily apparent to those skilled in the art of preparing such oils.

The examples note the use of blown linseed and blown cottonseed and blown soya bean oil as the modifiers for the polyhydric alcohol-polybasic acid resins. Other blown oils may however be used satisfactorily as for example perilla oil, castor oil, China-wood oil, etc., as well as any of the blown oils in the class of drying and semi-drying oils.

Instead of the solvents mentioned in the examples, we may use various other solvents such as propyl, isopropyl, and isobutyl alcohols; secondary alcohols, such as secondary butyl, amyl and hexyl alcohols; and the aromatic alcohols such as benzyl, cyclohexyl alcohols, etc. The choice of solvent will depend to some extent upon the solvent contents desired in the finished resinous composition and upon the availability of the material.

The resin compositions described above may be used as unpigmented coatings or there may be incorporated therewith pigments to produce colored coating compositions or enamels. Fillers may also be used with pigments if desired. The choice of pigments and fillers will be readily understood by those skilled in the art of preparing pigmented resinous coating compositions.

The resin solutions may be used with cellulose derivative combinations, for example, nitrocellulose dispersions to produce lacquers. Such lacquers may contain, in addition, other lacquer ingredients as softeners, plasticizers, other natural or synthetic resins, pigments, fillers, dyes, etc.

The enamels prepared from the resinous combination may be applied to suitable surfaces by well known means as for example spraying, brushing, dipping, etc. If desired the coatings may be allowed to air dry or they may be preferably dried by subjecting for a short period of air drying if desired and then baking at elevated temperature of, for example, 220° F. for a period of 30 minutes after which treatment a hard, tough and durable film is formed. The coating may be baked at a lower temperature of between 140-150° F. with a corresponding increase in time or at a higher temperature, for example, 300° F. with a corresponding decrease in time.

The products of the present invention are useful in preparing coating compositions for protective and decorative purposes on various types of surfaces such as wood, metal, glass, etc. either pigmented or non-pigmented. The products may be further used in combination with cellulose derivatives as the esters or ethers to produce various types of lacquers. Other uses for the products because of the very desirable properties possessed by them will readily suggest themselves to those skilled in the art.

As will be seen from the foregoing description, we have disclosed a new method for producing improved combinations of the fatty oil modified polyhydric alcohol-polybasic acid resins and urea-aldehyde condensations. The resinous compositions described herein produce coating compositions yielding hard, tough and water resistant films. These resinous compositions are further advantageous in that the enamel compositions made therefrom can be converted into hard, tough and durable protective coatings by baking at relatively low temperatures.

As many apparently widely different embodiments of this invention may be made without departing from the spirit and scope thereof, it is to be understood that we do not limit ourselves to the specific embodiments thereof except as defined in the appended claims.

We claim:

1. A process for making compatible compositions of urea-formaldehyde condensation product and polyhydric alcohol-polybasic acid resin modified with a fatty oil of the class consisting of drying and semi-drying oils, said process comprising forming said polyhydric alcohol-polybasic acid resin by reacting polybasic acid with the product obtained by heat treating in the presence of an alcoholysis catalyst polyhydric alcohol and an oxidized oil of said class which is obtainable by blowing the oil and heating at 160-200° F., and heating a solution of the polyhydric alcohol-polybasic acid resin thus obtained with the urea-formaldehyde reaction product.

2. A compatible resinous composition obtained by heating in solution urea-formaldehyde condensation product and the resinous reaction product of polybasic acid with the product obtained by heating polyhydric alcohol and an oxidized fatty oil which is selected from the class consisting of drying and semi-drying oils and which is obtainable by heating the oil at 160-200° F. while blowing air therethrough.

JAMES B. BULLITT, Jr.
DONALD E. EDGAR.